Jan. 5, 1965   K. RÄNTSCH ETAL   3,164,819
INSTRUMENT FOR INDICATING THE ADJUSTED POSITION
OF A SLIDING HEAD IN A MACHINE TOOL
Filed Sept. 20, 1961   14 Sheets-Sheet 1
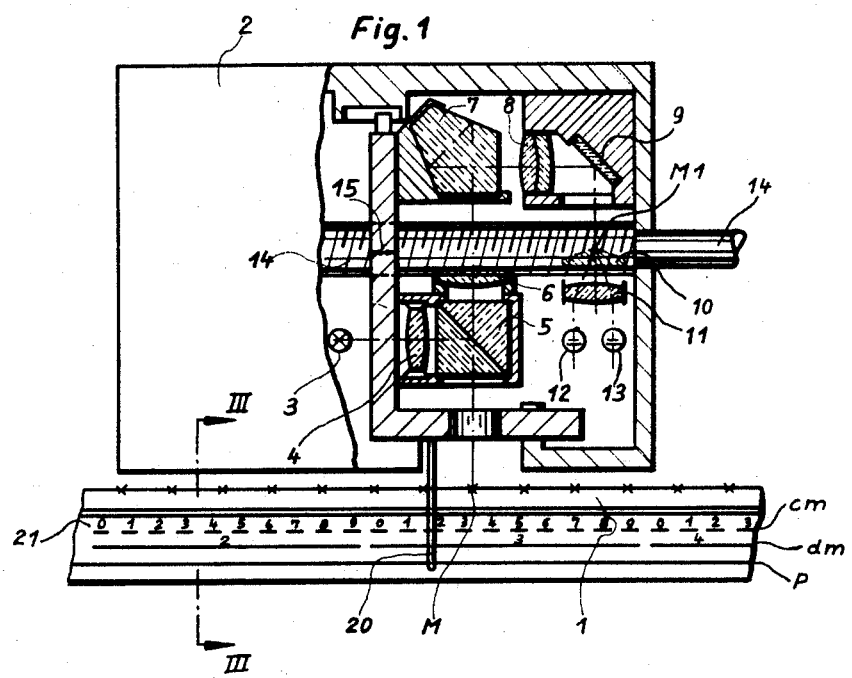
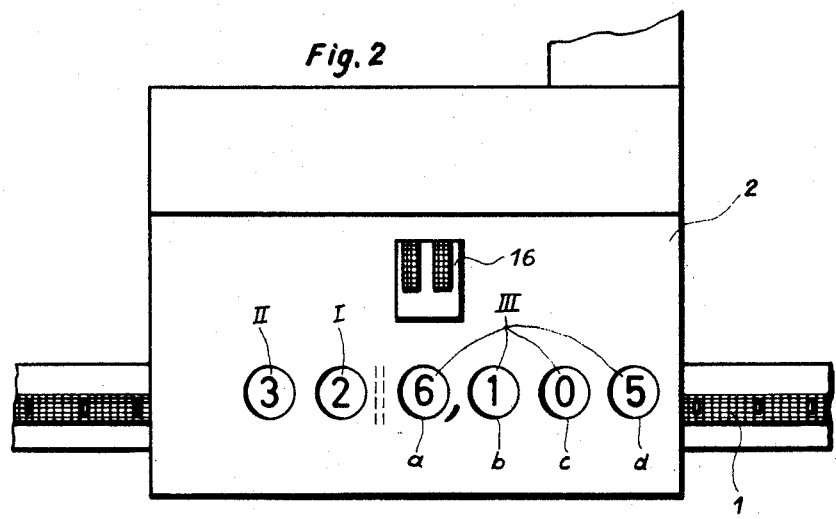
INVENTORS
KURT RANTSCH
OTTO AMBROSIUS
BY Toulmin & Toulmin
ATTORNEYS

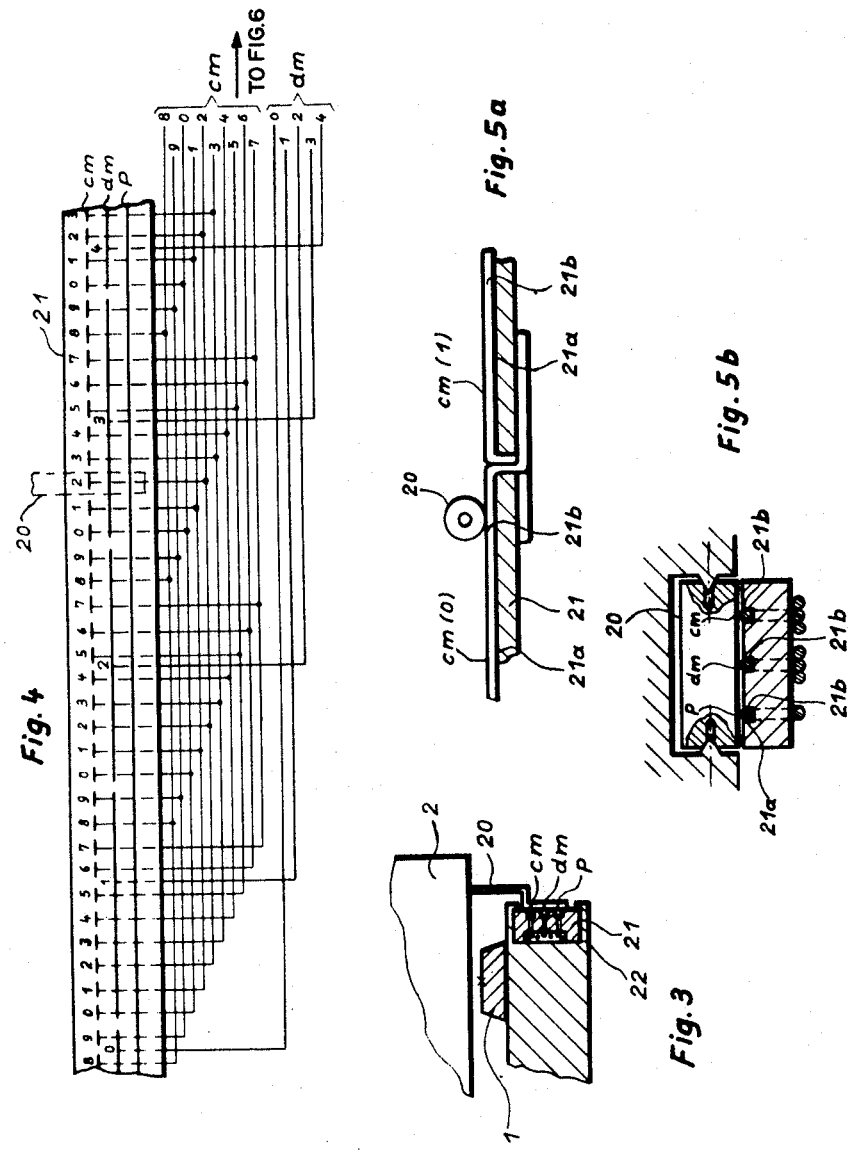

Jan. 5, 1965 K. RÄNTSCH ETAL 3,164,819
INSTRUMENT FOR INDICATING THE ADJUSTED POSITION
OF A SLIDING HEAD IN A MACHINE TOOL
Filed Sept. 20, 1961 14 Sheets-Sheet 3

INVENTORS
KURT RANTSCH
OTTO AMBROSIUS
BY *Toulmin & Toulmin*
ATTORNEYS

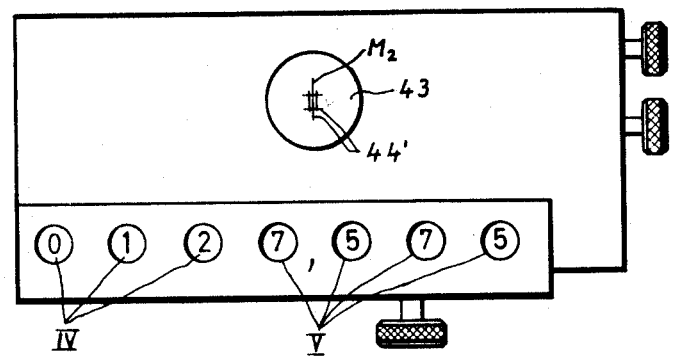
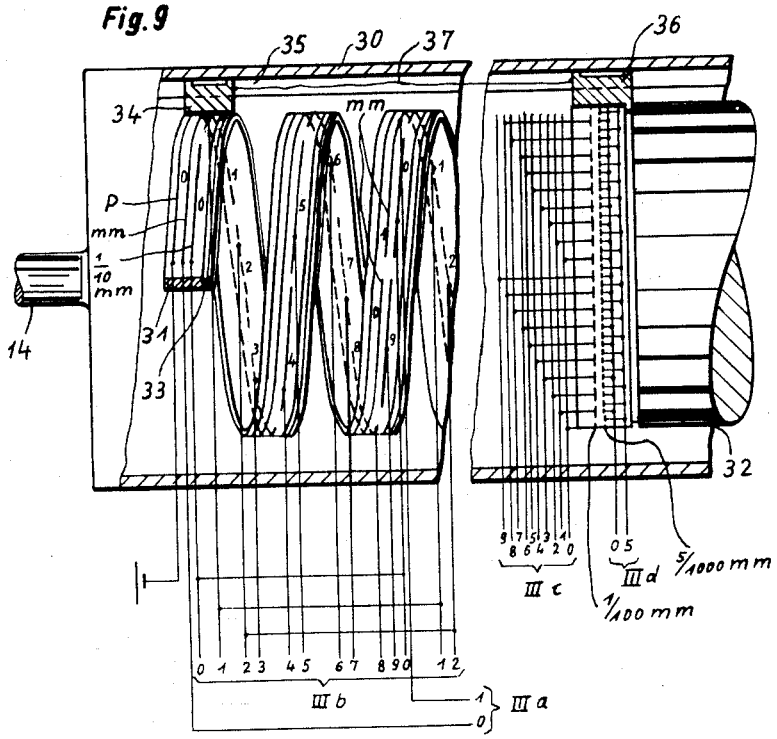

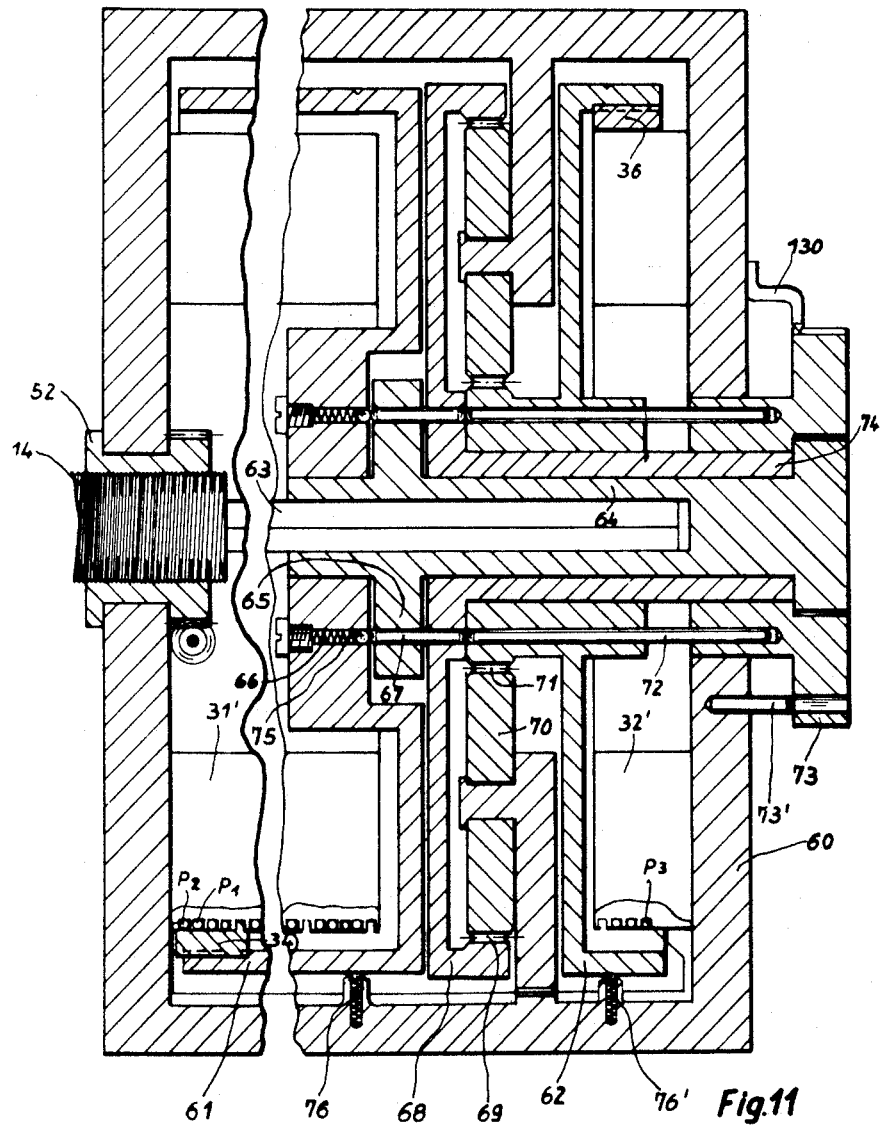

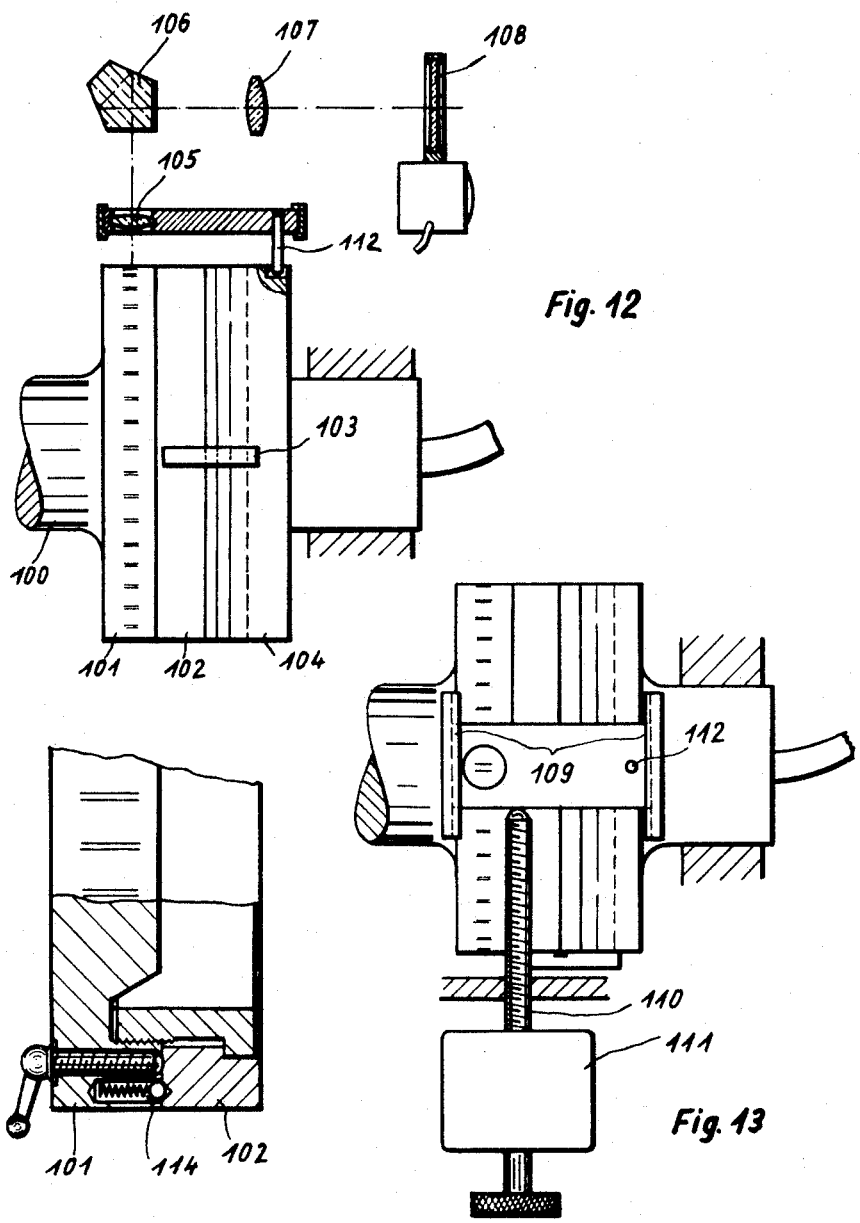

Jan. 5, 1965 K. RÄNTSCH ETAL 3,164,819
INSTRUMENT FOR INDICATING THE ADJUSTED POSITION
OF A SLIDING HEAD IN A MACHINE TOOL
Filed Sept. 20, 1961 14 Sheets-Sheet 9

INVENTORS

KURT RANTSCH
OTTO AMBROSIUS

BY Toulmin & Toulmin
ATTORNEYS

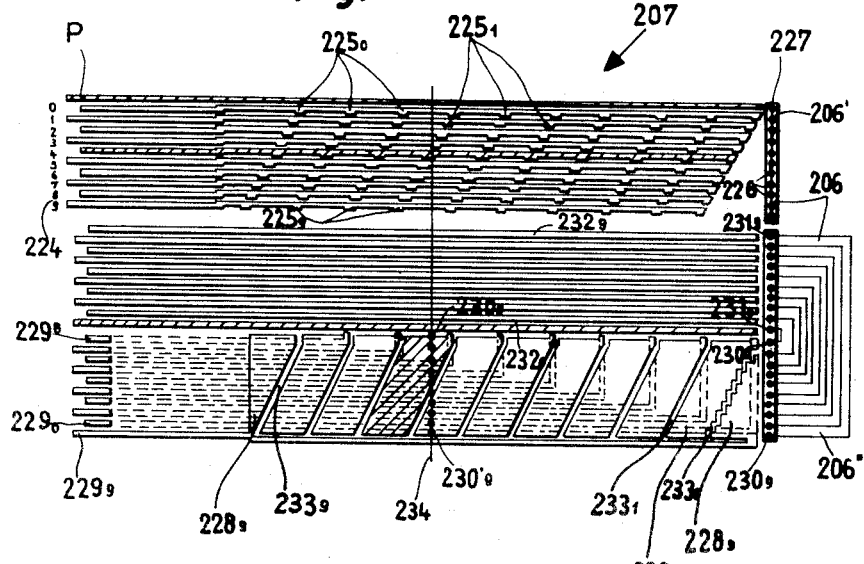
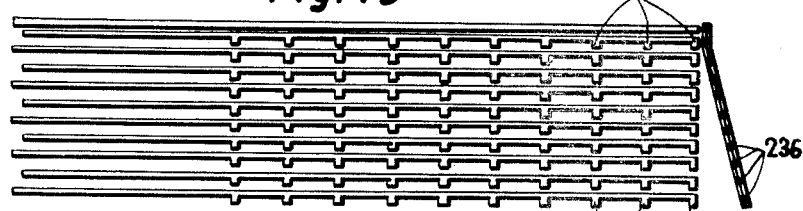
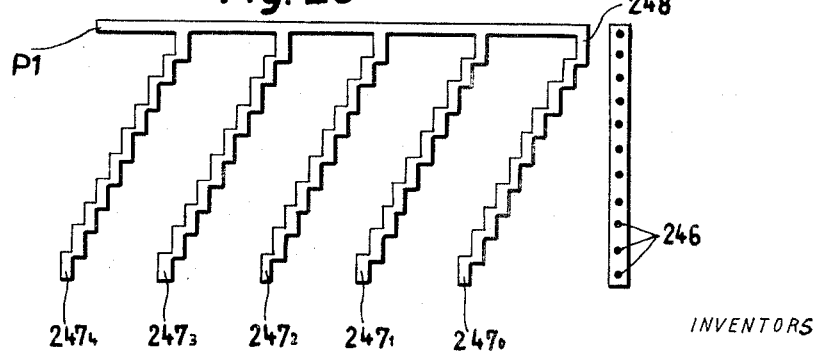

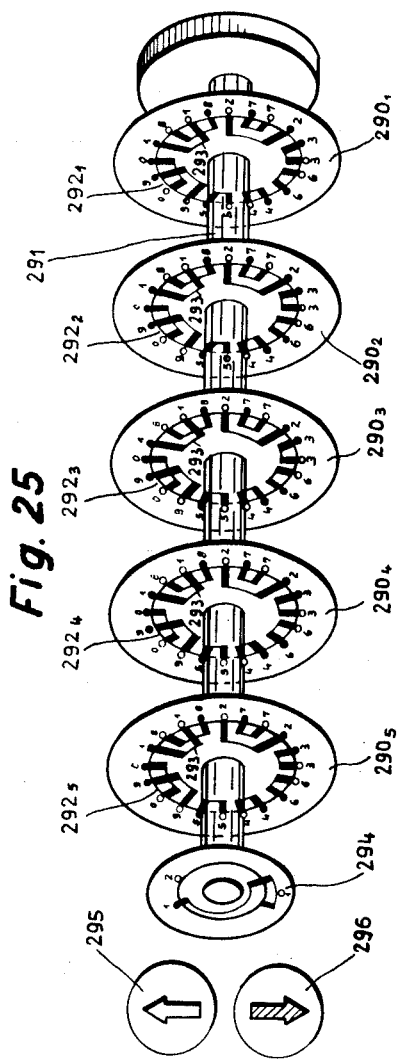
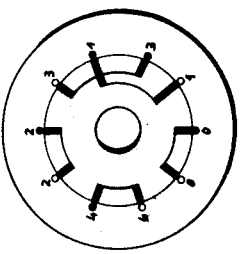

Jan. 5, 1965     K. RÄNTSCH ETAL     3,164,819
INSTRUMENT FOR INDICATING THE ADJUSTED POSITION
OF A SLIDING HEAD IN A MACHINE TOOL
Filed Sept. 20, 1961     14 Sheets-Sheet 13

INVENTORS
KURT RANTSCH
OTTO AMBROSIUS

BY *Toulmin & Toulmin*
ATTORNEYS

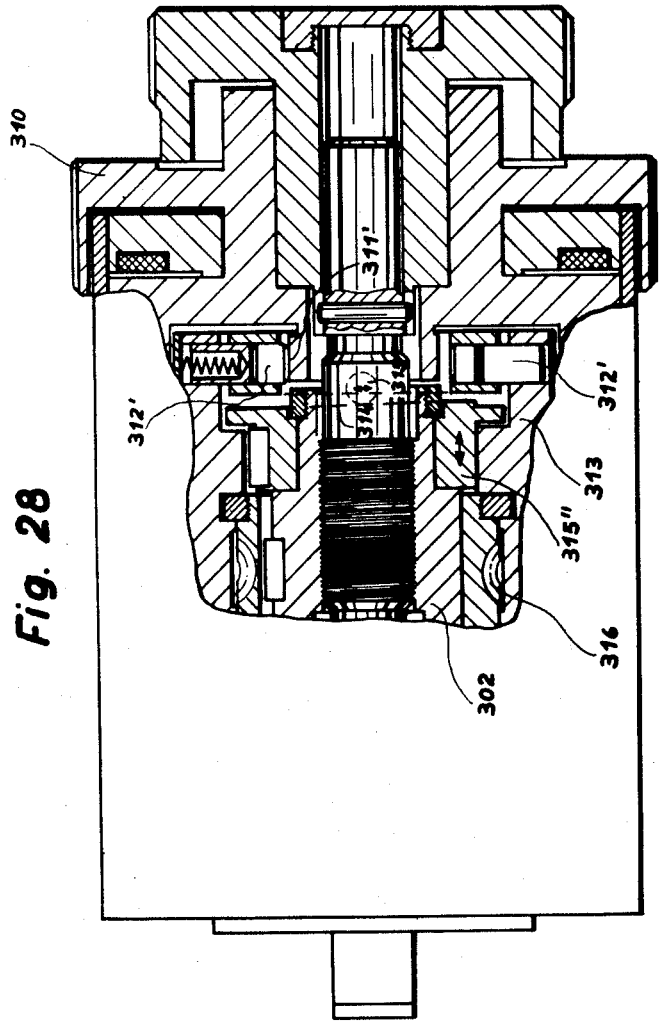

United States Patent Office 3,164,819
Patented Jan. 5, 1965

3,164,819
INSTRUMENT FOR INDICATING THE ADJUSTED POSITION OF A SLIDING HEAD IN A MACHINE TOOL
Kurt Räntsch, Wetzlar (Lahn), and Otto Ambrosius, Oberbiel, near Wetzlar, Germany, assignors to M. Hensoldt & Söhne, Optische Werke Aktiengesellschaft, Wetzlar (Lahn), Germany
Filed Sept. 20, 1961, Ser. No. 139,506
Claims priority, application Germany, Sept. 23, 1960, H 40,499; Aug. 5, 1961, H 43,334
8 Claims. (Cl. 340—212)

The present invention relates to an instrument for indicating the adjusted position of a sliding or rotating element in a machine, more particularly, a linear or angle-measuring instrument especially adapted for use in machine tools or the like wherein the adjusted value is clearly indicated by numeral read-out electronic tubes or the like.

It is particularly desirable to have the results of measuring instruments indicated in numeral read-out electronic tubes since in this way the value can be quickly read with virtually no possibility remaining for errors in reading. However, in previously devised instruments having numeral read-out tubes such tubes are connected with pulse generating means. This connection requires very complicated circuits and electronic auxiliary components wherein the entire instrument becomes very complex in structure and accordingly expensive to manufacture. In addition, such instruments have the further disadvantage in that they are incapable of being set to zero (0) in a simple manner in any position of the sliding head of the machine.

It is therefore the principal object of this invention to provide a novel and improved instrument for indicating the adjusted positions of sliding or rotating elements in a machine.

It is a further object of this invention to provide an instrument in which the result can be quickly read on figure read-out electronic tubes wherein the instrument does not require complicated circuit arrangements or electronic auxiliary components.

It is an additional object of this invention to provide an instrument for indicating the adjusted position of a sliding element in a machine wherein an absolute zero adjustment may be made in the instrument at any position of the sliding element.

One embodiment of the instrument of this invention essentially comprises a plurality of contacts which are connected with the corresponding cathodes of the numeral read-out tubes together with at least one brush which slides over the contacts. The brush applies a voltage to the contacts which voltage is dependent on the adjusted displacement of the sliding element. The voltage applied to the contacts is directly transmitted to the read-out tubes and results in the illumination of the figures corresponding to the adjusted position of the element.

A single read-out tube can be provided for each decimal value of the measurement. A series of contacts is then connected to each read-out tube wherein each contact corresponds to a particular figure or numeral of the tube. The contacts of each series which correspond to the same figures are connected with each other and with the corresponding cathodes of the read-out tubes.

In order to illustrate the basic concept of this invention assume it is desired to obtain a reading in centimeters over a range of one meter. Ten decimeter contacts are then positioned with each contact corresponding to a figure between 0 and 9. Each contact is connected with the corresponding cathode of the read-out tube for the decimeter values. The length of the contact is about ten centimeters.

In addition, 100 centimeter contacts are arranged in groups of ten each beside each decimeter contact. Each contact of each group of centimeter contacts is similarly coordinated to one of the figures between 0 and 9. The contacts of each centimeter group corresponding to the same numerals are connected with each other and to the corresponding cathode of the read-out tube for the centimeter values.

The brush is responsive to the movement of the sliding element and can be directly mounted thereon. The brush simultaneously applies a voltage to one of the centimeter and one of the decimeter contacts so that corresponding numerals are illuminated in the read-out tubes.

It is possible that with the above-described arrangement the brush may be positioned precisely between contacts of one series after the sliding head has been moved to its adjusted position. In this situation two figures would be simultaneously illuminated in the read-out tube and the measured value would be uncertain. This uncertainty can be avoided with an optical reading device having an adjustable image-forming objective therein. This objective influences the image path of the light rays coming from the scale or division mark which is positioned below the objective lens. In such an instrument the adjusted position of the optical element would correctly indicate the adjusted position of the sliding element.

In the instrument of the present invention the situation occasionally occurs that the brush indicating the centimeter values is positioned in the center of a centimeter contact when the instrument is reset to 0. Should the sliding head be then adjusted from this position, a new centimeter figure would be indicated by a numeral in the read-out tube after the sliding head has been moved a distance of only one-half of a centimeter. The resulting incorrect readings can be eliminated by the "zero" switch disclosed in this invention. A series of contacts for a decimal reading are positioned by steps transversely across the reading scale with the brush for engaging this series of contacts similarly being subdivided into ten individual brush contacts or portions. At least one of these brush contacts can be selectively connected with a source of electrical energy. The switch for selecting the brush contacts which are to be connected with a source of electrical energy is coupled with the "zero" switch.

With this structure, a voltage can be applied only to that brush contact which is accurately positioned at the beginning of the measuring interval for the corresponding decimal reading. Therefore, by displacing the sliding head from this position, a new figure is illuminated in the read-out tube only after the full measuring interval has been traversed by the sliding head.

The "zero" switch of this invention essentially comprises two discs which are rotatable with respect to each other. Ten terminals are arranged on each disc. The terminals on one disc are connected with the cathodes of the corresponding read-out tube and the terminals on the other disc with the contacts corresponding to a decimal value. In order to avoid a tangling of the connecting wires after repeated 0 adjustments by rotating the discs with respect to each other, the terminals on one of the discs are arranged equidistantly from each other and are connected with the cathodes of the corresponding read-out tube as well as with additional terminals which are connected with the contacts. The second disc is provided with a plurality of bridging means each of which short-circuits a cathode terminal and a contact terminal.

Other objects and advantages of this invention will be apparent upon reference to the accompanying description when taken in conjunction with the following drawings, wherein FIGURE 1 shows a side elevational view of a linear measuring instrument of this invention with a portion of the housing removed to show details of the optical reading device;

FIGURE 2 is a top plan view of the instrument shown in FIGURE 1;

FIGURE 3 is a sectional view taken along the line III—III of FIGURE 1;

FIGURE 4 is a schematic view of the contact collector surface on which the contacts are mounted in the instrument of FIGURE 1;

FIGURES 5a and 5b are sectional views of portions of the contact collector surface of FIGURE 4;

FIGURE 8 is a top plan view of the modified instrument of FIGURE 7;

FIGURE 9 is an elevational view of a component of the modified instrument of FIGURE 7 and showing the helical and annular arrangement of the contacts;

FIGURE 11 is a modification of the component illustrated in FIGURE 9;

FIGURE 12 is a schematic arrangement of a further modification of this invention which is particularly adapted for measuring angular values;

FIGURE 13 is a top plan view of the arrangement illustrated in FIGURE 12;

FIGURE 14 is a detailed view of an arresting means used in the modification of FIGURES 12 and 13;

FIGURE 18 illustrates schematically the arrangement of the contacts and bridges for indicating millimeter and centimeter values;

FIGURE 19 is a modified arrangement of the contacts and bridges as shown in FIGURE 18;

FIGURE 20 is a further modification of the contact arrangement shown in FIGURE 18;

FIGURE 25 is an exploded view of a switch for reversing the terminals of the contacts;

FIGURE 26 is a modification of the switch of FIGURE 25;

FIGURE 28 is a longitudinal sectional view of the measuring screw illustrated in FIGURE 27.

Figure 15:
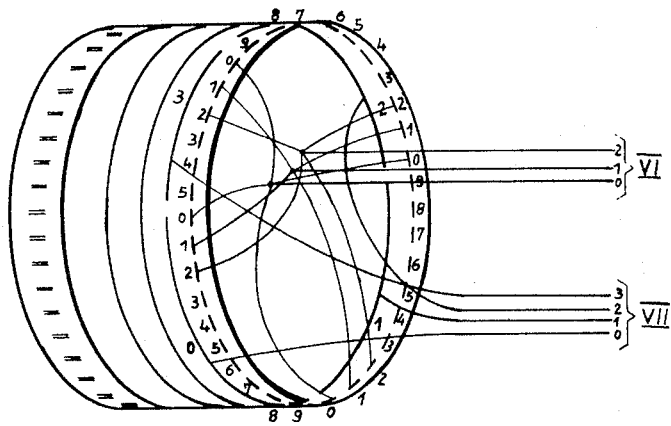
FIGURE 15 is a perspective view of the rings employed in a modified instrument of FIGURES 12 and 13.

Proceeding next to the drawings wherein like reference symbols indicate the same parts throughout the various views, there is shown in FIGURES 1 through 3 a measuring scale 1 above which is slidably mounted an optical reading device 2 which is movable in response to the sliding head of a machine tool. The scale or division marks on the scale 1 appearing below the reading device 2 are illuminated by a light 3 which passes through a lens 4 and a dividing prism 5. The light rays emanating from the measuring point M on the scale pass through the dividing prism 5 and into an objective 6. The objective 6 gathers the light rays in parallel relationship and then directs them through a pentaprism 7 into an objective 8. The objective 8 collects the rays onto a reflecting surface 9 from which they are reflected onto the edge of a prism 10.

The image $M_1$ of the division mark M which is produced on the edge of the prism 10 is reflected by a lens 11 onto two photoelectric cells 12 and 13. If the division mark M is not exactly positioned in the optical axis of the objective 6, then the image $M_1$ will not exactly be on the edge of the prism 10 and, accordingly, the photoelectric cells 12 and 13 will receive unequal illumination.

In order to adjust the position of the image $M_1$ onto the edge of the prism 10, a rotary mounted screw 14 is provided which displaces the objective 6 and the pentaprism 7 in the direction of the arrow 15. The rotation of the screw 14 is a measure of the exact adjusted position. The precise position of the division mark with respect to the objective 6 is indicated in a so-called "magic eye" electronic indicating tube 16, shown in FIGURE 2. This tube has two shadow bands which coincide when the photoelectric cells 12 and 13 receive equal illumination.

A brush 20 is connected with the adjustable objective 6 and slides over a plurality of contacts mounted on a collector supporting surface 21. The collector surface 21 is slidably mounted in a guide member 22 so as to be adjustable with respect to the scale 1.

The brush 20 comprises a metallic roll in order to reduce the friction as it rolls over the contacts and to reduce the wear.

The scale 1 is a centimeter scale and is provided with light-colored division or scale marks at regular intervals of one centimeter on a dark surface in order to facilitate the photoelectric balance.

The collector surface 21 is provided with a plurality of series of contacts with one contact series corresponding to centimeters and having one contact for each centimeter value. These contacts are arranged in a row designated as *cm* and are provided with figures 0 through 9. Ten contacts of the *cm* series are bridged by a single contact of a decimeter series *dm*. The contacts of the decimeter series are also provided with figures 0 through 9.

A power supply contact P is also mounted on the collector surface 21 and extends over the entire length of the *cm* and *dm* contacts. This power supply contact is equal to the range of measurement of the scale so that the figure read-out tubes will not be energized when the measuring range is exceeded.

Figure 6:
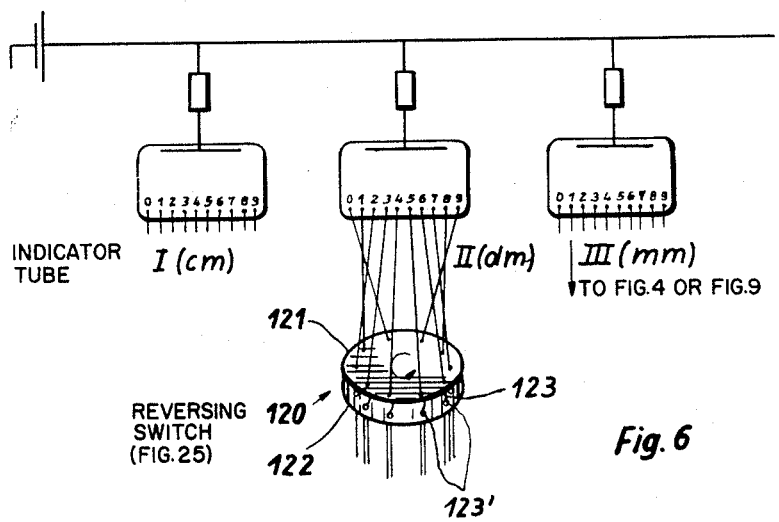
FIGURE 6 shows schematically the arrangement of the read-out tubes of the instrument of FIGURE 1.

As can be seen in FIGURE 4, the contacts of the *cm* series, which are provided with the same numerals, are connected with each other and also with the cathodes 0 through 9 of a numeral read-out tube indicated by I and shown in FIGURE 6. In a similar manner, the contacts of the decimeter series *dm* are also provided with the same figures connected to each other and with the corresponding cathodes of a read-out tube II.

When the brush 20 is in its position as shown in FIGURE 4, it connects the power supply contact P with contact "3" of the decimeter series as well as with contact "2" of the centimeter series. Since these contacts are connected with the corresponding cathodes of the read-out tubes I and II, the corresponding numerals are illuminated in these tubes as shown in FIGURE 2. In the first two decimal places of the read-out panel the value "32 centimeters" is read. When the brush 20 is moved through a distance of 1 decimeter, the figures 0 through 9 will subsequently be illuminated in tube I. After the brush 20 passes over contact "9," the brush will engage a new contact of the decimeter series and the next-higher numeral will appear in the read-out panel.

While the brush is energized by engaging a continuous power supply contact P, the brush can also be directly connected to a source of electrical energy.

In order to obtain a 0 reading in the read-out tubes I and II at any position of the sliding head, the contact surface 21 is slidably mounted in its guide 22. The contact or collector surface 21 is then moved to the right until the figure 0 appears below the brush 20 for the centimeter series.

In order to obtain the 0 reading in tube II, a reverse switch 120 is provided between the centimeter contacts and the tube II as shown in FIGURE 6. The reverse switch comprises a pair of discs 121 and 122 which are rotatably mounted with respect to each other. The disc 121 comprises ten sliding contacts 123 which are connected with the cathodes of the read-out tube II and slide over terminals 123' on the disc 122. The terminals 123' are connected with the decimeter contacts.

In order to obtain a 0 reading, the disc 121 is rotated through a sufficient angle so that the decimeter contact for the figure 0 is connected with the cathode for the figure 0. The sliding head can now be adjusted to a new position and the figure read-out tubes I and II will indicate the actual distance through which the sliding head has been adjusted.

The details of construction of the collector surface 21 are shown in FIGURES 5a and 5b. The collector surface 21 is provided with grooves 21a into which wires 21b are positioned. The contact ends of the wires are guided through suitable openings in the collector surface. The wires extend under the collector surface where they are connected with corresponding wires according to FIGURE 4. As shown in FIGURE 5b, the grooves are filled with an insulating material after the wires are positioned therein so that the wires are immovably embedded in the grooves and only their upper surface projects above the collector surface. The wires 21b are so insulated that they permit the passage of electric current only along the surface on which the brush 20 rolls over the contact wires.

If the contact brush 20 were directly connected with the sliding head, it would be possible that after an adjustment of the sliding head, the brush would be positioned exactly between two centimeter contacts. In this situation two numerals would simultaneously be illuminated in tube I and the measured result would be uncertain. However, this uncertainty is eliminated by connecting the brush 20 with the adjustable objective 6. The objective is adjusted to ascertain the precise measured value and after adjustment of the instrument the optical axis of the read-out device points directly to a mark on scale 1. Simultaneously, after this adjustment, the brush 20 is positioned exactly in the center of a centimeter contact since a centimeter contact is coordinated to each mark on the scale.

As also illustrated in FIGURES 2 and 6, an additional read-out tube III is provided which indicates the millimeter, $1/10$ millimeter, $1/100$ millimeter and $5/1000$ millimeter values.

In order to obtain the smaller decimal values, a rotatable cylinder or drum 30 is mounted on the screw 14, as shown in FIGURE 9. Mounted within the drum 30, so as to be stationary therein, is a helical body 31 connected to a cylindrical body 32. The threads on the screw 14 are so selected that two revolutions of the screw displace the objective 6 one millimeter. The total range of displacement is estimated to be ten millimeters. In order to provide a source of electrical energy to illuminate the read-out tubes III in response to rotation of the screw 14, a current-carrying contact P is arranged in 20 turns on the helical body 31. Beside the contact P, millimeter contacts are arranged at a length of about 2 windings each, which contacts are similarly designated with figures from 0 to 9. Each millimeter contact is subdivided into ten $1/10$ millimeter contacts which also correspond to figures 0 to 9. The millimeter contacts are directly connected to the cathodes of read-out tube IIIa. Since only one contact is provided for each figure, the maximum displacement would be ten millimeters.

The $1/10$ millimeter contacts are so connected that the contacts corresponding to the same figures are interconnected and then connected to the corresponding cathodes of the read-out tube IIIb.

The helical body 31 is further provided with a groove 33 which functions as a guide member for a brush 34. The brush 34 is also guided in a guide member 35 which is mounted on the inner surface of the drum 30 and parallel with respect to the axis of rotation of the drum. When the screw 14 is rotated, the brush 34 will slide over the helically arranged contacts on the body 31 and the corresponding figures will be illuminated in read-out tubes IIIa and IIIb depending on the position of rotation of the drum.

In principle, it would also be possible to arrange the $1/100$ millimeter contacts also on the helical body 31. However, in this case each rotation of the drum would illuminate the same figures in the read-out tubes. For this reason it is simpler to arrange the $1/100$ millimeter contacts annularly on the cylindrical body 32. Corresponding contacts of this series are similarly connected with each other and with the corresponding cathodes of the read-out tube IIIc.

In addition, each $1/100$ millimeter contact is subdivided into two $5/1000$ millimeter contacts so that in the last read-out tube IIId the figures 0 and 5 appear alternately. No individual current supply contacts are coordinated to the $1/100$ and $5/1000$ millimeter series of contacts. Instead, a brush 36 which slides over these angularly arranged contacts is connected by a lead 37 with the brush 34 so as to be energized therefrom.

As can be seen from FIGURE 9, the current supply contact P terminates at the 0 contacts of the millimeter and $1/10$ millimeter series of contacts. Accordingly, when the screw 14 is rotated too far, the brush 34 is no longer supplied with electrical energy and all of the read-out tubes III will be extinguished.

In the event the contacts provided in the drum 30 are to indicate meter, decimeter and centimeter values, and two revolutions of the drum would correspond to a displacement of the sliding head over a distance of one meter, the meter and decimeter contacts would then be arranged in helical form and the centimeter contacts would be arranged in annular form.

Figure 7:
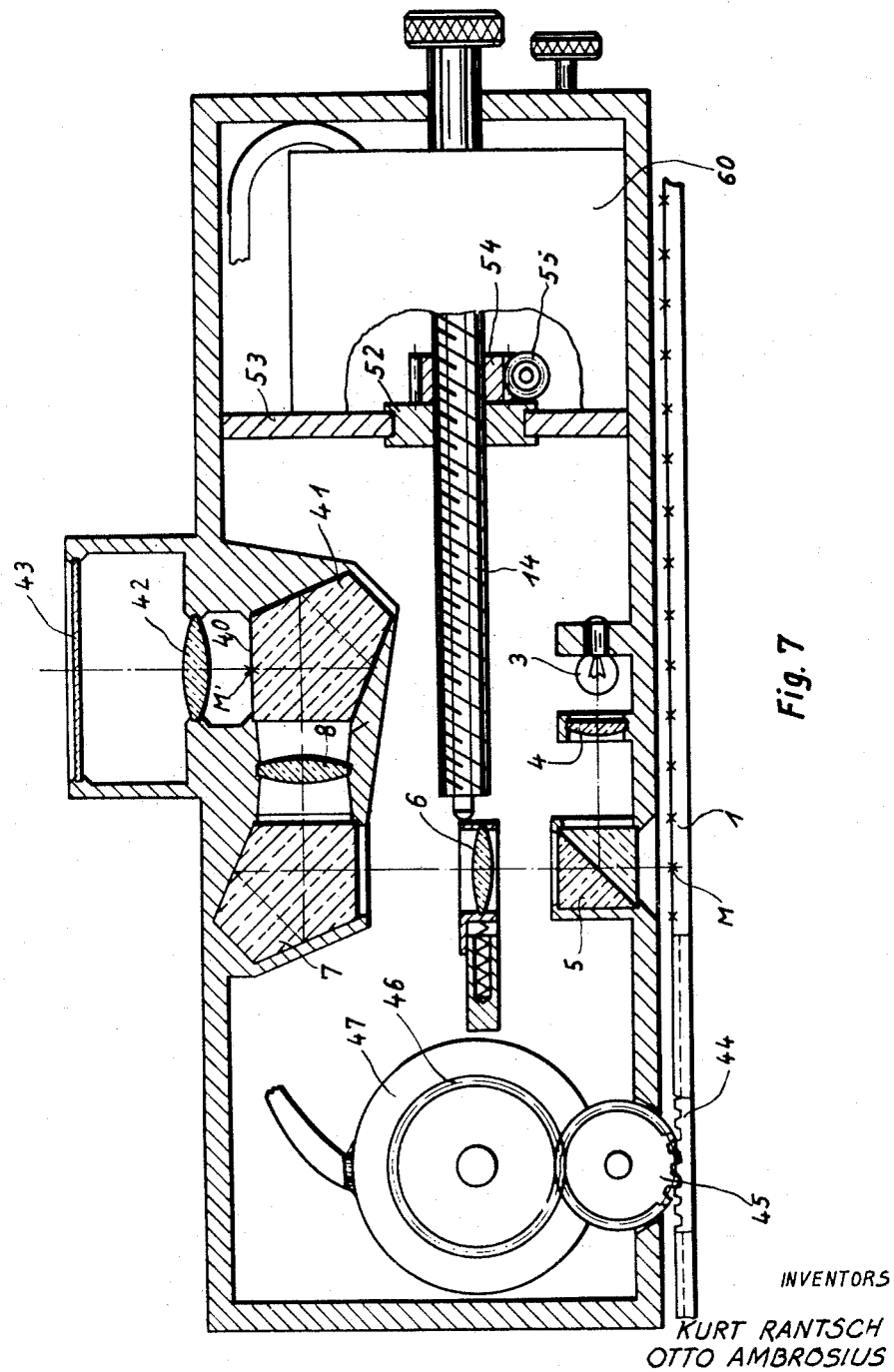
FIGURE 7 is a view similar to that of FIGURE 1 and showing a modification of the instrument.

A modification of this invention is illustrated in FIGURE 7. In FIGURE 7 several components of the reading device as illustrated in FIGURE 1 are also shown. However, after the lens 8 there is provided a pentaprism 41 which has an exit surface 40 upon which the image of the mark M' is produced by the lens 8. This image is then projected through a lens 42 into a viewing window 43. A cross-hair 44' is provided in the viewing window 43 and is shown in FIGURE 8. By adjusting the objective 6, a scale mark M can always be projected onto the cross-hair 44'. The adjustment of the objective is again effected by the screw 14.

Figure 10:
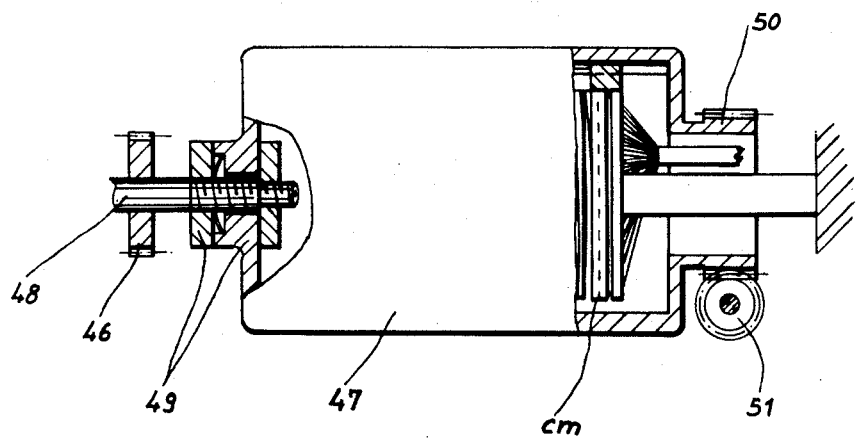
FIGURE 10 is an elevational view of an additional component of the modified instrument of FIGURE 7.

The modification illustrated in FIGURE 7 provides for the indication of greater displacements of the sliding head than the instrument shown in FIGURE 1. Accordingly, a rack gear 44 is positioned beside the scale 1 and meshes with a pinion 45. The pinion 45 further meshes with a gear 46 to drive a drum 47. The drum 47 is illustrated in FIGURE 10.

The interior of the drum 47 is similarly provided with helically and annularly arranged contacts. The annularly arranged contacts are for measuring centimeters. The arrangement of the decimeter and meter contacts corresponds to the millimeter and $1/10$ millimeter contacts which are illustrated in FIGURE 8. The transmission ratio between the pinion and the drum 47 is so chosen, that two revolutions of the drum correspond to a displacement of the instrument through a distance of 1 meter.

The gear 46 is mounted on a shaft 48 which is connected with the drum 47 through a clutch 49. The drum 47 is provided with a ring gear 50 which meshes with a worm 51.

This arrangement described immediately above functions in the following manner: If it is desired to obtain a zero reading in the read-out tubes at any position of the instrument 2, it is only necessary to rotate the worm 51 until the brushes mounted in drum 47 connect the zero contacts with the read-out tubes IV. The gear 46 does not follow this rotation so that, as a result, the position of the instrument 2 with respect to the measuring scale 1 remains unchanged.

The drum 30, as shown in FIGURE 9 and previously described, can be positioned so that the screw 14 is supported in a nut 52, as illustrated in FIGURE 7. The nut 52 is rotatably mounted in the wall 53 of the reading instrument. A worm gear 54 is connected to the nut 52 and meshes with a worm 55. With this arrangement it is relatively easy to obtain the zero position at any desired position of the objective 6. The drum 30 is rotated until the brushes connect the zero contacts with read-out tube V and the figure 0 appears in the read-out tubes V. During this rotation the objective 6 has been displaced and the position of the image of mark $M_2$ with respect to the cross-hair 44' has been changed. In order to again align the mark $M_2$ with the cross-hair 44' without causing a movement of the drum 30, the nut 52 is rotated. This nut will displace the screw 14 in an axial direction without rotating it.

Proceeding next to FIGURE 11 there is shown a sectional view of a modified drum 60 which can be substituted for the drum 30 shown in FIGURE 7. Contrary to the drum 30 which permits measurements of the order of magnitude of $5/1000$ of a millimeter, the drum 60 is so constructed that one can obtain readings of the order of $1/1000$ millimeter.

The drum 60 comprises two annular flanged brush rings 61 and 62 which can be rotated independently from each other. The ring 61 is rotatable with the screw 14 at a ratio of 1:1, whereas the brush ring 62 rotates five times as rapidly as the screw 14. Accordingly, the contacts over which the brush ring 62 slides can be constructed in a greater length. This makes it possible to subdivide each $1/100$ millimeter contact into ten $1/1000$ millimeter contacts. Both of the brush rings 61 and 62 are rotatably supported on a shaft 64. The screw 14 is interconnected with the shaft 64 by means of a four-sided shaft 63. The four-sided shaft 63 permits axial displacements of the shaft 64 without interfering with the zero position.

A body 31' which corresponds to the helical body 31 shown in FIGURE 9 engages the brush ring 61. The body 31' similarly has mounted thereon the millimeter and $1/10$ millimeter contacts. The brush ring 62 engages a cylindrical body 32' upon which are mounted the $1/100$ and $1/1000$ millimeter contacts. A clutch disc 65 is mounted on the shaft 64 and is so positioned so as to be selectively connected either with the brush ring 61 or with a disc 68 of a planetary gear.

The planetary gear comprises a ring gear 69 mounted in a disc 68 and engages a plurality of planetary gears 70. The gears 70 are fixedly mounted in the drum 60. The rotary axes of the gears 70 transmit the rotary movement of the gears onto a sun gear 71 which is connected with the ring collar 62. The transmission ratio of this planetary gear is 1:5.

In order to selectively couple the clutch disc 65 with either the brush ring 61 or the disc 68, the brush ring 61 and the discs 65 and 68 are provided with five bores each 66 which are angularly spaced from each other by 72°. Five pins 67 are slidably arranged in the bores of the disc 65. The bores of the disc 68 also house five pins which can be displaced by means of an axially displaceable rotatable knob 73. Springs 75 are positioned in the bores 66 of the brush ring 61 in order to urge the pins 67 to the right as viewed in FIGURE 11. The pins 67 are of sufficient length so that when the rotary knob 73 is moved to the left the pins 67 can enter the bores 66 and accordingly couple the disc 65 and the brush 61. In addition, when the rotary knob 73 is pushed to the right, these pins can couple the discs 65 and 68.

The knob 73 is fixedly connected with the brush ring 62 by pins 72 so that this brush ring can be rotated directly by the knob 73.

It is preferable, although not necessary, that the knob 73 be rotated only when the discs 65 and 68 are connected. For this reason an arresting member 73' is provided which prevents rotation of the knob 73 when it has been adjusted to its left-hand position.

In addition, a resilient arresting member 130 also engages with the outer surface of the knob 73. This arresting member 130 prevents the knob 73 from revolving through more than one revolution. Otherwise, an incorrect result would occur. When the knob 73 has been rotated through several revolutions, the objective is displaced beyond $1/10$ of a millimeter. Since the brush ring 61 is not affected, a $1/10$ millimeter value would be lost and an incorrect result would be obtained.

It is also preferable, but not necessary, that the screw 14 can be rotated only by the knob 74 when the knob 73 has been adjusted to its left-hand position. For this purpose the knob 73 is so constructed that it is coupled with the knob 74 when pushed to the right.

Two resilient detent members 76 and 76' are provided to position the brush rings 61 and 62 in such a manner that the brushes 34 and 36 are positioned exactly in the center of a $1/10$ millimeter or $1/1000$ millimeter contact after each revolution.

The above-described modification which is illustrated in FIGURE 11 operates in the following manner.

Commencing from the zero position wherein the knob 73 is moved to its left-hand position, the knob 74 is rotated. This causes a displacing of the objective 6 and a rotation of the brush ring 61. Corresponding values will then appear in the read-out tubes. The rotation is terminated when the mark $M_2$ is aligned in the cross-hair 44'. For a precise adjustment, the knob 73 is moved to the right and the discs 65 and 68 are coupled. The knob 73 is then rotated. This rotary movement is transmitted through the gearing onto screw 14 so that a precise setting can take place. The exact measured value can be seen in the read-out tubes V for the last two decimal places.

In order to obtain a zero position, the knob 73 is moved to the right and the figure 0 is set in the last two decimal places. Subsequently, the knob 73 is moved to the left and the value 0 set in the next two decimal places by rotating the screw 14. The displacement of the objective 6 which thus occurs is subsequently compensated for by rotating the nut 52.

Two power supply contacts $P_1$ and $P_2$ are provided on the helical body 31'. The contact $P_2$ is connected to a further power supply contact $P_3$ which is mounted on the annular body 32'. The power supply contact $P_1$ is connected directly with a source of electrical energy. The power supply contact $P_2$ is supplied with electric current by the brush 34.

The advantage of this arrangement is that the brush 34 is no longer supplied with electric current by the current contact $P_1$ when the objective is rotated beyond the measuring range. Accordingly, the contacts $P_2$ and $P_3$ are no longer supplied with electric current and all the read-out tubes are extinguished.

In contrast to the modification as shown in FIGURE 9, a direct connecttion between the brushes 35 and 36 is not preferable in this modification since the brush ring 62 is rotatable with respect to the brush ring 61.

Proceeding next to FIGURES 12, 13 and 14 there is shown a modification of this invention which is particularly adapted for setting and reading angular values.

A shaft 100 is to be rotated through a certain angle. For this purpose a ring 101 having a divided circle thereon is mounted on the shaft. Connected with the divided circle ring is a ring 102 upon which is mounted a brush 103. A ring 104 is positioned beside the ring 102 and has mounted thereon annularly arranged contacts.

The scale on ring 101 is provided with 36 graduations or division lines so that this circle is subdivided into 10° units. As a result, 36 figures must appear in the corresponding read-out tubes.

For purposes of clarity the connections between the individual contacts and the read-out tubes VI and VII are only partially indicated in FIGURE 15. The cathodes 0, 1, 2 and 3 of the read-out tube VI are connected to corresponding circuits since no additional figures are needed. All of the ten cathodes of the read-out tube VI are connected to the corresponding contacts.

The rings 101 and 102 are rotatable with respect to the ring 104 and in response to their rotation corresponding figures are illuminated in the readout tubes VI and VII.

Figure 16:
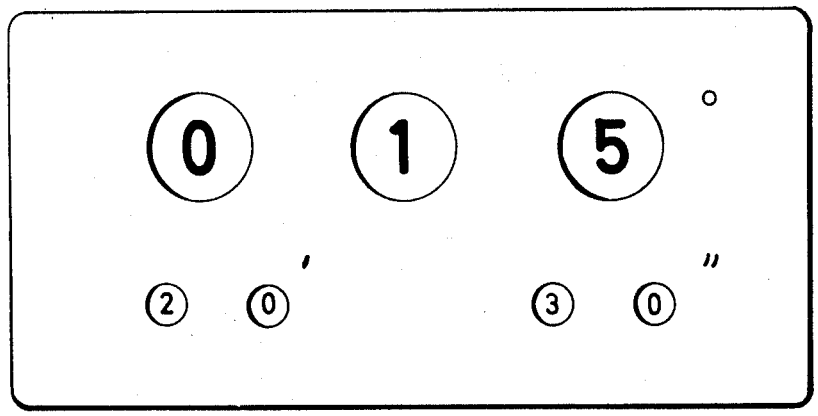
FIGURE 16 is a view of the read-out panel of the instrument illustrated in FIGURES 12 and 13.

In order to obtain precise measured values a scale mark appearing below an objective 105 is projected through a prism 106 and a lens 107 into a viewing window 108. The viewing window 108 is provided with an index mark. In order to obtain a coincidence of a scale marking with the index mark, the objective 105 is displaceably mounted in a guide member 109. The displacement of the objective is effected by means of a screw 110. On the screw 110 a drum 111 is positioned which indicates the degree, minute and second values in read-out tubes 8 of FIGURE 16 in a manner similar to the drums used in the linear measuring instruments.

Since it is possible that upon rotation of the rings 101 and 102 the brush 103 is positioned exactly between two contacts of the ring 104, the ring 104 is rotatable through small angles of about 10°. This rotation is effected by means of a follower 112 connected with the objective mounting 109 and engaging a radial slot in the ring 104. When the objective is displaced in order to ascertain a precise measurement, the ring 104 will rotate below the brush 103 in such a manner that the brush 103 after having aligned the scale mark with the index in the viewing window 108 is again exactly positioned in the center of a 10° contact.

In order to obtain a zero reading the brush ring 102 is rotatable with respect to the ring 101 as can be seen in FIGURE 14. The ring 102 is rotated through a sufficient distance until the value 0 appears in the read-out tubes VI and VII. A spring detent 114 is positioned between the rings 101 and 102 in order that the ring 102 may be rotated in such a manner that the brush is positioned in the center of a 10° contact when a scale marking has been aligned with the objective 105.

Figure 17:
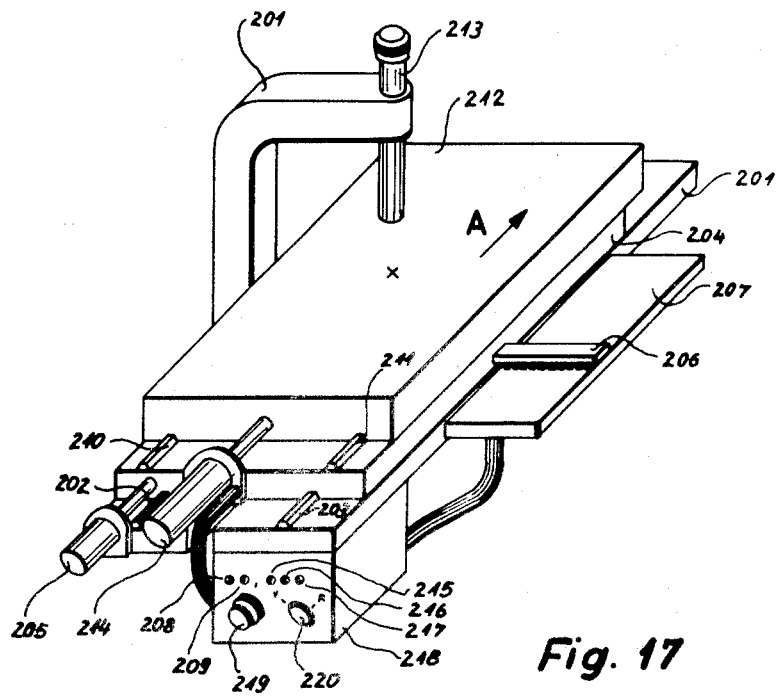
FIGURE 17 is a perspective view of a machine having a further modification of the measuring instrument of this invention mounted thereon.

Proceeding next to FIGURE 17 there is shown a portion of a machine tool comprising a base 201 upon which are mounted two guide members 202 and 203 to linearly guide a sliding head 204. An adjusting screw 205 is used to displace the head 204.

A brush 206 is mounted on the sliding head 204 and slides over a collector surface 207 which is mounted on the base 201. The collector surface has a plurality of contacts which will be later described and which are connected to the cathodes of read-out tubes 208 and 209. The figures seen in these read-out tubes correspond to the displacement of the sliding head. Linear guide members 210 and 211 are provided on the sliding head 204 to guide a plate 212 which is displaceably mounted thereon. The work piece which is to be measured is mounted on the plate or table 212. The measuring points of the work piece are determined by means of a microscope 213. The table 212 is slidably displaced by means of a measuring screw 214. When the screw 214 is rotated, contacts associated therewith in a manner to be presently described are short-circuited and voltages are applied to corresponding cathodes of read-out tubes 215, 216 and 217. As a result, the displacement of the sliding head 212 with respect to the sliding head 204 is easily read in absolute figures.

The read-out tubes are enclosed in a casing 218 in which is also mounted a "zero" switch 219 which provides for a zero setting in the read-out tubes 208 and 209 in any position of the sliding head 212 with respect to the base 201. In addition, a switch 220 is mounted in the casing 218 for reversing the terminals of leads extending from the collector surface 207 or the screw 214, respectively, when the sliding head 212 is displaced in the direction of the arrow A, so that a correct sequence of figures is illuminated in the read-out tubes 208, 209, 215, 216 and 217 in response to the direction of movement of the head 212.

The components of the invention as generally described above are now illustrated and described in detail. Proceeding next to FIGURE 18 there is shown the collector surface 208 as well as the brush 206. The collector surface comprises ten contact bars 224 for indicating the millimeter values and having the figures 0 through 9. The contact bars are connected with the corresponding cathodes of the read-out tube 209. In addition, a power supply contact P is mounted on the surface 207.

The contact bars 0 through 9 are provided with individual contacts $225_0$ to $225_9$ which are positioned from each other by a distance of one centimeter. These contacts are so staggered transversely across the collector surface 207 that ten contacts extend over a one centimeter interval.

The brush 206 has a brush portion 206' which slides over the millimeter contacts and is provided with ten brush contacts 226 which are arranged side-by-side. In addition, there is a brush contact 227 which engages the power supply contact P. The contacts 226 and 227 are short-circuited. When the brush portion 206' is moved over the millimeter contacts, the contacts $225_0$ to $225_9$ are successively supplied with current through contacts 226 and correspondingly a numeral in the read-out tube 209 is energized and illuminated.

To indicate centimeter values the brush portion 206'' slides over centimeter contacts $228_0$ to $228_9$. Each of these contacts or fields is connected by leads $229_0$ to $229_9$ to a cathode of the read-out tube 208. Accordingly, whenever a current is supplied to one of the fields $228_0$ to $228_9$ a corresponding figure in the read-out tube 208 is illuminated.

The fields $228_0$ to $228_9$ are supplied with electrical energy by the brush portion 206'' which is provided with ten brush contacts $230_0$ to $230_9$. These brush contacts $230_0$ to $230_9$ are electrically connected with brush contacts $231_0$ to $231_9$. The contacts $231_0$ to $231_9$ slide on ten current supply lines $232_0$ to $232_9$. However, at any one time only one of the supply lines 232 is energized so that this modification functions in the following manner:

When supply line $232_0$ is connected with a source of electrical energy, only the contact fields $228_0$ to $228_1$ can be supplied with electric current through the contact $230_0$. When brush portion 206'' is displaced on the centimeter collector surface, a corresponding numeral will be illuminated in the read-out tube 208 each time a contact field $228_0$ to $228_9$ is passed.

The edges of the contact fields 228 are inclined transversely across the collector field 201 to form limiting lines $233_0$ to $233_9$ each of which bridges a distance of one centimeter.

This arrangement has the following advantage. When the brush 206' is moved to the position indicated by the line 234, the number 4 will be illuminated in the millimeter read-out tube and the number 6 in the centimeter read-out tube. If it is desired to obtain a zero-setting in this position of the sliding head, the terminals of the contacts $224_0$ to $224_9$ are reversed in such a manner that the contact $225_3$ is connected with the zero cathode of the read-out tube 209, the contact $224_4$ with the cathode of the read-out tube corresponding to the numeral 1 and so on. The terminals of the connecting lines $229_0$ to $229_9$ for the indication of the centimeter values are simultaneously reversed so that the line $229_6$ is connected with the cathode of the read-out tube 208 corresponding to the numeral 0, the cathode corresponding to numeral 1 is connected with a line $229_7$ and so on.

When a further movement of the sliding head is commenced from this position and the movement is to be measured, the next value numeral 1 will already be indicated in the read-out tube 208 after the contact 230' has been displaced by 0.6 centimeter because in the position in which the zero adjustment was carried out this contact was positioned approximately in the center of the contact field $228_6$. As a result, incorrect readings in the read-out tube 208 with respect to positions of the sliding head 206 are eliminated. The switch which conducts the polarity reversal of the supply lines is so constructed that only the line $232_6$ is connected to a source of electrical energy. This means that the contact $230_6$ which has just passed over the limiting line $233_6$ in the above-mentioned end position of the sliding head is now supplied with electric current. Thus, when the sliding head is again displaced, the contact $230'_6$ must now travel a full centimeter before a new value is indicated in the read-out tube.

Additional constructions of the collector surface 207 are possible in addition to that illustrated in FIGURE 2. As shown in FIGURE 19 the millimeter contacts $235_0$ to $235_9$ are arranged in side-by-side relationship but the brush contacts 236 which correspond to the brush contacts 226 of FIGURE 18 are positioned at an angle so that they bridge a centimeter interval. This arrangement can also be used for indicating the centimeter values by arranging the limiting lines $233_0$ to $233_9$ vertically with respect to the direction of displacement of the measuring scale and by staggering the contacts $230_0$ to $230_9$.

As an alternative construction to connecting the millimeter contacts $225_0$ to $225_9$ to the corresponding cathodes of the read-out tubes, the brush contacts may also be connected with this read-out tube. In this modification, however, the brush contacts may be insulated from each other. This modification is illustrated in FIGURE 20. The brush contacts are indicated at 246. The millimeter contacts $225_0$ to $225_9$ are again transversely arranged but are connected with each other so that step-like contact lines $247_0$, $247_1$, and so forth are formed.

Accordingly, if the contacts 246 are moved, one of the brush contacts will engage a transverse contact line such as $247_1$ and the corresponding read-out tube 209 will be energized. The transverse lines $247_0$ to $247_4$ are supplied with electric current through the current supply contact $P_1$ which, in turn, is supplied with current through a brush contact 248.

Figure 21:
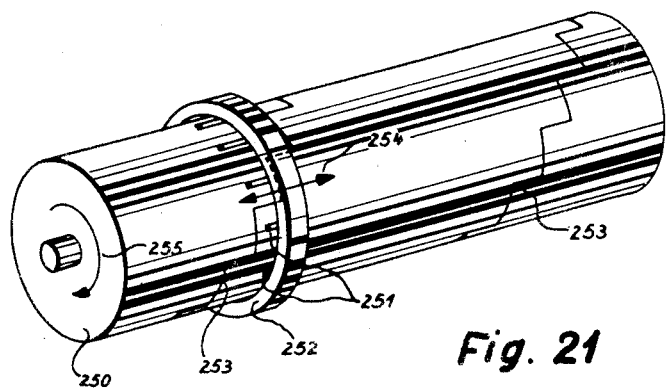
FIGURE 21 is a perspective view showing the arrangement of contacts and bridges for indicating decimeter values.

Proceeding next to FIGURE 21 there is illustrated therein an embodiment of a contact collector surface for measuring decimeter values. This embodiment comprises a drum 250 which is provided with contact fields similar to the centimeter contact fields illustrated in FIGURE 18. The drum 250 is rotatable in a clockwise direction as indicated by the arrow 255. Contacts 251 are mounted in a ring 252 which is movable longitudinally with respect to the drum 250. Decimeter contact fields 253 are connected with the corresponding cathodes of a numeral read-out tube.

Only one of the contacts 251 is energized at any one time, such as illustrated in FIGURE 18 with reference to the centimeter contacts. The limits of the contact fields 253 extend transversely and are preferably inclined so that the length of the steps in the direction 254 is always one centimeter. In addition, the contacts are transversely staggered in such a manner that the ten contacts provided bridge a distance of one centimeter. As a result of this construction, after a zero adjustment and a subsequent displacement of the sliding head for decimeter measuring, a full decimeter interval must be travelled each time before a new numeral is illuminated in the corresponding read-out tube. Accordingly, one of the respective contacts 251 is connected with a source of electrical energy. These contacts are selected by the switch for effecting the corresponding adjustment for indicating the millimeter values. When this switch is turned by four switching units, then current is passed to the fifth contact 251. In addition, the drum 250 is rotated through such a distance in the direction of the arrow 255, until the contact 251 which is energized is directly positioned behind a contact field limiting line. The magnitude of this rotation corresponds to the value of the corresponding switch necessary for the zero adjustment of the centimeter value. As a result, the rotation can be effected simultaneously with the zero adjustment for the centimeter value.

Figure 22:
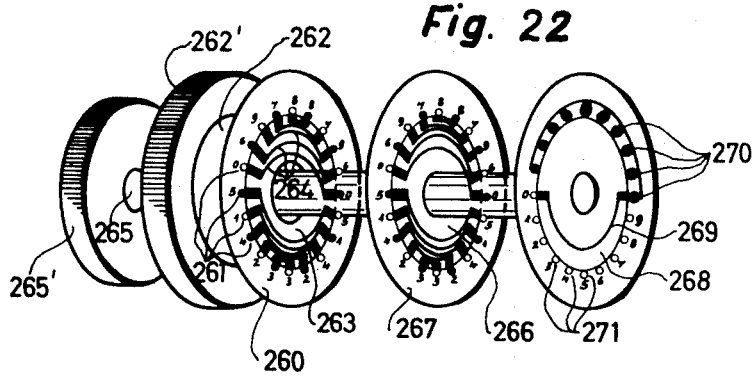
FIGURE 22 is an exploded view of the "zero" switch disclosed in this invention.

Proceeding next to FIGURE 22 there is illustrated a switch for resetting to 0 the numeral read-out tubes 208 and 209. The switch comprises several parts with the first part consisting of a ring 260 on which twenty terminals 261 are mounted. Ten of these terminals are illustrated in FIGURE 22 as dark points and are connected with the centimeter contacts $229_0$ through $229_9$. The remaining ten terminals are illustrated as circles and are connected with the cathodes of the numeral read-out tube 208. A numeral is coordinated to each terminal.

Reference to FIGURE 22 will reveal that the numerals for the contact terminals are arranged in a clockwise sequence whereas the numerals for the cathode terminals are arranged in a counter-clockwise sequence. Further, the contact and cathode terminals are alternatively positioned on the ring 260.

There is a rotary shaft 262 which has a disc 263 mounted thereon. The disc 263 has bridges 264 which bridge one of the terminals connected with the contacts and one of the terminals connected with a cathode of the read-out tube 208. In the initial position as illustrated in FIGURE 22, these bridges connect two poles at a time which are coordinated to the same numerals. When the shaft 262 rotates through an angle of 18°, the bridges 264 connect terminals numbered 0–1, 1–2, 2–3, and so on.

Further rotation of the shaft 262 through an angle of 18° will enable the bridges 264 to connect the terminals numbered 0–2, 1–3, 2–4, and so on. As a result of this arrangement, the zero value can appear in the read-out tube 208 at any position of the sliding head 204 and the brush 206 which is attached thereto.

There is a shaft 265 on which corresponding bridge 266 is mounted in order to bridge the terminals arranged on a disc 267. The terminals of the disc 267 are connected with the leads 225' and the cathodes of the read-out 209. By rotating shaft 265 through the knob 265', one of the contacts 225 can be connected with the cathode corresponding to the numeral 7 in each position of the brush portion 206.

Also mounted on the shaft 265 is a disc 268 upon which is mounted a bridge 269. The bridge 269 provides a connection between ten terminals 270 which are connected with a source of electrical energy and one of the terminals 271. The terminals 271 are connected with leads $232_0$ to $232_9$ so that when the zero value is indicated in the read-out tube 209, one predetermined contact of the contacts $230_0$ to $230_9$ is supplied with current in a manner as previously described.

If the sliding head 204 illustrated in FIGURE 17, is to be dipslaced over a maximum distance of only 5 centimeters, then it is necessary that only 5 numerals be illuminated in the read-out tube 208, namely the numerals 0 to 4. In this case the switch illustrated in FIGURE 24 can be used for a zero adjustment of the centimeter values. The switch of FIGURE 24 also comprises a pair of discs with a stationary disc 280 and a rotatable bridge disc 281. Ten terminals are mounted on the disc 280 with five of the terminals again illustrated as dark spots and five illustrated as circles. The terminals illustrated as spots 282 are connected with the corresponding contacts of the centimeter contacts wherein the terminals 283 illustrated as circles are connected with the corresponding cathodes of the numeral read-out tube 208. The coordination of the numerals to the terminals is again such that the contact terminal numerals 0 to 4 are arranged in a clockwise direction and the cathode terminal numerals 0 to 4 are arranged in a counter-clockwise direction. The bridges 284 of the disc 281 in their normal position also connect the poles coordinated to the same numerals. In this arrangement a desired zero reading is obtained by rotating the disc 281 through angles of 36°.

Figure 24:
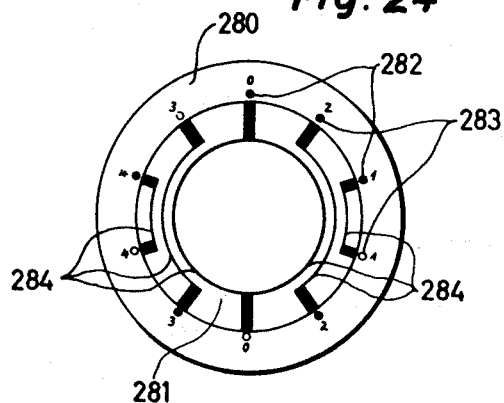
FIGURE 24 shows a further modification of the "zero" switch of FIGURE 22.

The "zero" switch illustrated in FIGURES 22 and 24 can be arranged, if desired, for seven or four values to be indicated in one read-out tube as would most likely be the case when angular measurements are being made.

Figure 23:
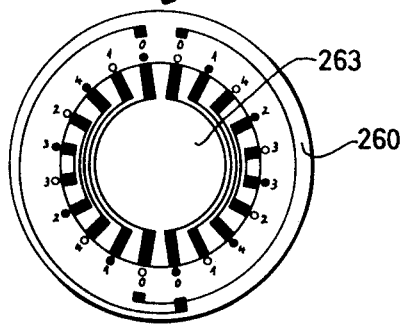
FIGURE 23 is a modification of the "zero" switch of FIGURE 22.

The embodiment of FIGURE 23 can be used when only five figures are to be indicated in the read-out tube 208 but wherein twenty terminals are provided on stationary disc 260 in the manner as illustrated in FIGURE 22. In this embodiment the terminals on the disc 260 which are diametrically opposed are electrically connected with each other. The bridge disc 263 is constructed in the same manner as illustrated in FIGURE 22.

The embodiment of FIGURE 23 has the advantage in that when it is desired to obtain a zero adjustment for only five indicating values, a switch can be used which is constructed as illustrated in FIGURE 22. This considerably simplifies the construction of the instrument.

It is a general requirement in the machine tool industry that when the sliding head is displaced in either the forward or reverse direction, starting from a zero position, the indicating numerals registered in the read-out tubes measure the distance that the sliding head moves regardless of the direction in which it is moved. As pointed out in FIGURE 17, the sliding head is movable in the direction of the arrow A and then in reverse. In order to obtain a direct reading of the displacement of the sliding head regardless of the direction in which it is moved, a switch such as illustrated in FIGURE 25 is connected between the switches shown in FIGURE 22 and the cathodes of the read-out tubes.

The switches of FIGURE 25 comprise a plurality of stationary discs $290_1$, $290_2$, $290_3$, $290_4$ and $290_5$ each of which has twenty terminals thereon of which ten terminals are connected with the corresponding terminals of the zero switch of FIGURE 22 and the remaining ten terminals are connected with the cathodes of the read-out tube. The discs $292_1$ through $292_5$ are mounted on a shaft 291. The discs 292 have bridges 293 thereon which, as a result of the rotation of shaft 291, connect the terminals numbered 0, 1, 2 and so forth with each other and when the shaft is clockwise rotated by an angle of 144° the terminals numbered 0 and 9 are connected with each other and with the terminals 1 and 8, 2 and 7 and so forth. In this arrangement the construction of the terminals as well as of the bridges differs somewhat from the arrangement of the "zero" switch illustrated in FIGURE 22.

The five switches shown in FIGURE 25 are shown for selectively registering in either the forward or reverse directions the centimeter, millimeter as well as the 1/10 millimeter, 1/100 millimeter and 1/1000 millimeter values. Positioned on the shaft 292 is another switch 294 which, according to the rotary position of the shaft 291, will illuminate one of the lamps 295 or 296. These lamps indicate by means of an arrow in which direction the counting is being performed when the sliding head 204 is being displaced.

These terminals as described immediately above may be arranged as set forth below wherein the arabic figures indicate the correspondence of the numerals between the contacts and cathodes of the numeral read-out tubes, the subscript 1 the connection of these terminals with the cathodes and the subscript 2 the connection of these terminals with the contacts or vice versa. The following clockwise distribution of the terminals proved to be suitable: $0_1$, $9_1$, $0_2$, $9_2$, $5_1$, $5_2$, $4_2$, $4_1$, $6_1$, $6_2$, $3_2$, $3_1$, $2_1$, $7_2$, $7_1$, $2_1$, $8_1$, $1_2$, $8_2$, $1_1$. In this embodiment the bridge connects in its normal position the terminals $0_1$, $0_2$; $1_1$, $1_2$; etc. and after a clockwise rotation by 144° the terminals $0_1$, $9_2$; $1_1$, $8_2$; etc.

FIGURE 26 is a modified version of the switch shown in FIGURE 25. This embodiment is suitable for use where the maximum displacement range of the table 204 is 5 centimeters. In this case it is not necessary to use the complicated switch construction shown in FIGURE 25. The switch in FIGURE 26 will be adequate. The following clockwise distribution of the terminals can be chosen: $0_1$, $0_2$, $4_2$, $4_1$, $2_2$, $2_1$, $3_2$, $1_1$, $3_2$, $1_2$. In its initial position the bridge must then connect the terminals $0_1$, $0_2$; $1_1$, $1_2$; etc. and in a position obtained by a clockwise rotation by 144° the terminals $0_1$, $4_2$; $1_1$, $3_2$; etc.

As previously mentioned, the screw 214 displaces the table 212 with respect to the sliding head 204. This displacement is for the purpose of obtaining the precise measurement in the magnitude of 1/1000 millimeter.

Figure 27:
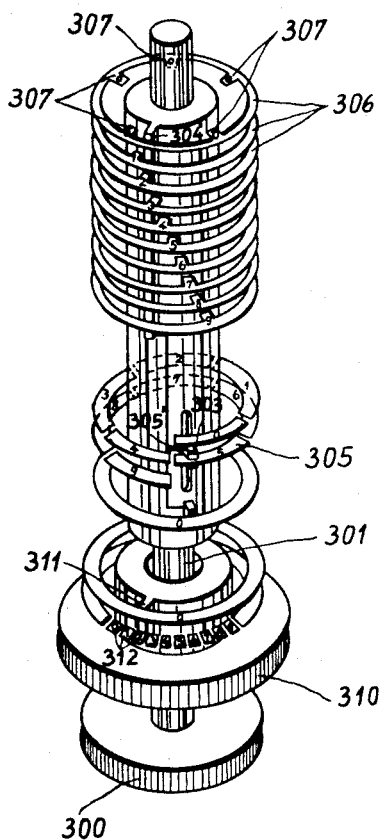
FIGURE 27 is a perspective and schematic view of a measuring screw of this invention.

Proceeding next to FIGURES 27 and 28 there is shown a rotary knob 300 which is mounted on a screw 301 and which rotates in a nut 302. Two brushes 303 and 304 are mounted on the screw. The brush 303 is axially displaceable in a longitudinally extending slot 305'. The pitch of the screw is 0.5 millimeters per revolution so that two revolutions are necessary in order to displace the table 212 through a distance of 1 millimeter.

The brush 303 slides over a helical contact 305. The various segments of this contact correspond to various numerals as indicated by the figures 0 to 9. The helical contact 305 is used to register 1/10 millimeter values.

Ten rings 306 are mounted on the screw 214. Each ring has five contacts 307. The contacts of the various rings 306 are staggeredly arranged with respect to each other and each ring corresponds to a measuring value by connecting each of the rings 306 with the cathode of a read-out tube for the 1/100 millimeter values. When the knob 300 is rotated the brush 304 sweeps successively over the contacts 0 through 9 of the ten rings 306 and subsequently again over the neighboring contacts 0 through 9 of these rings and so on.

The screw 214 is connected with an additional rotary knob 310 upon which is mounted a brush 311 that sweeps over contacts 312 for indicating the 1/1000 millimeter values. The knob 310 has an eccentric portion 311' thereon as can be seen in FIGURE 12, which displaces bolt 312' radially with respect to the rotary axis when the knob 310 is rotated. The bolts 312' are supported in a body 313 in which are mounted two pins 315 which are staggeredly arranged with respect to each other by 90° and which pins engage an inclined surface 314. The inclined surface 314 is a portion of an axially displaceable body 315" which acts on nut 302. When the knob 310 is rotated, the screw 301 is simultaneously displaced by a corresponding amount.

In addition, the nut 302 is axially displaceable by means of a worm 316. This displacement is provided since it is not possible to effect a zero adjustment of the 1/10, 1/100 and 1/1000 millimeter values according to the structure shown in FIGURES 18 and 22. Therefore, in order to obtain a zero adjustment of the exact measuring value, the knobs 300 and 310 are rotated back sufficiently far until the zero value appears in the corresponding read-out tubes 215, 216 and 217. However, by this movement of the knobs the screw 301 has been axially displaced and accordingly the table 212 has followed this movement. In order to compensate for this displacement of the table 212, worm 316 is turned whereby the screw and the table 212 are moved into their previous position. These displacements, however, are not indicated in the read-out tubes. The fact that the table 212 is returned to its original previous position can be easily ascertained by means of the microscope 213.

Thus it can be seen that the present invention has provided a simple structure for resetting to 0 an instrument for measuring the adjusted position of a sliding or rotating element of a machine.

It will be understood that this invention is susceptible to modification in order to adapt it to different usages and conditions and, accordingly, it is desired to comprehend such modifications within this invention as may fall within the scope of the appended claims.

What is claimed as this invention is:

1. An apparatus for indicating the position of a sliding element relative to an element having a scale, comprising: a row of contacts spaced apart so as to define said scale, with each contact representing a digit; a brush connected to said sliding element and engaging said contacts so as to define the position of said sliding element; means for feeding electric current to said brush; and a plurality of numeral-read-out electron tubes each having a plurality of cathodes, said tubes having their respective cathodes connected to said contacts, and said brush thereby completing an electric circuit through a related cathode upon engaging the associated contact thereof.

2. An apparatus as claimed in claim 1 wherein said brush comprises a roller contact.

3. An apparatus as set forth in claim 1 wherein said contacts comprise elongated metallic members embedded into a supporting surface, said brush is connected to a source of electrical energy and moves over said contacts in response to the movement of said sliding element.

4. An apparatus as claimed in claim 1 having a current supply contact adjacent said row of contacts, the length of said current supply contact being equal to the length of measurable movement of said sliding element whereby said electronic tubes are extinguished when said measuring range is exceeded.

5. An apparatus for indicating the position of a sliding element relative to a scale, comprising: a plurality of similar, parallel contact rows, with the contacts of each row being spaced so as to define said scale, with each contact representing a digit; a like plurality of brushes on said sliding element arranged substantially transversely to said contact rows, with at least one brush engaging a contact upon and during a relative movement between said scale and said slide element; means for connecting at least one of said brushes to a source of electrical energy; and a plurality of numeral read-out electron tubes having their anodes connected to said source of energy and their cathodes individually connected to said contacts.

6. An apparatus as claimed in claim 5 and further comprising a switch corresponding to each of said read-out tubes, said switch selectively energizing the numerals in the tubes in sequence in response to the movement of a sliding element and corresponding to the forward or reverse movement thereof.

7. An apparatus for indicating the position of a sliding element relative to an element having a scale comprising: a plurality of contacts spaced apart so as to define said scale, with each contact representing a digit; a brush connected to said sliding element and engaging said contacts so as to define the position of said sliding element; means for feeding electric current to said brush; a plurality of numeral-read-out electron tubes, each having a plurality of cathodes, said tubes having their respective cathodes connected to said contacts, said brush thereby completing an electric circuit through a related cathode upon engaging the associated contact thereof, and switch means corresponding to each of said read-out-tubes, said switch selectively energizing the numerals in the tubes in sequence in response to the position of the sliding element and a selected actuation of said switch energizing the zero numeral of said tube relative to a position of said sliding element.

8. An apparatus for indicating the relative position of two elements displaceable with respect to each other, comprising: a scale on a first one of said elements, being defined by a plurality of optically distinguishable markers; a first plurality of spaced contacts on said first element defining a corresponding scale; optical means on the second one of said elements for observing said markers, and including an element displaceable relative to both said elements along the extension of said scale; means on said second element for displacing said optical means; a second plurality of contacts on said last mentioned means; a first brush on said second element for engaging at least one contact of said first plurality of contacts; a second brush on said second element for engaging at least one contact of said second plurality of contacts; and a plurality of numeral read-out electron tubes having their anodes connected to said source of energy and their cathodes individually connected to said contacts.

References Cited in the file of this patent

FOREIGN PATENTS 560,012     Great Britain _____ Mar. 15, 1944